US011832624B2

(12) United States Patent
Espy et al.

(10) Patent No.: US 11,832,624 B2
(45) Date of Patent: *Dec. 5, 2023

(54) MULTI-ANGLE CARCASS WASH SYSTEMS, WASH CABINETS INCLUDING SAME, AND RELATED METHODS

(71) Applicant: BIRKO CORPORATION, Henderson, CO (US)

(72) Inventors: Tom Espy, Henderson, CO (US); Mike Gangel, Henderson, CO (US); Drew Mohnen, Henderson, CO (US); Chad McCune, Henderson, CO (US)

(73) Assignee: BIRKO CORPORATION, Handerson, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,905

(22) Filed: Aug. 5, 2022

(65) Prior Publication Data

US 2022/0369656 A1 Nov. 24, 2022

Related U.S. Application Data

(60) Continuation of application No. 16/667,508, filed on Oct. 29, 2019, now Pat. No. 11,412,748, which is a
(Continued)

(51) Int. Cl.
  *A22C 17/00* (2006.01)
  *A22C 17/08* (2006.01)
(Continued)

(52) U.S. Cl.
  CPC .......... *A22C 17/08* (2013.01); *A22C 17/0093* (2013.01); *B08B 3/022* (2013.01);
(Continued)

(58) Field of Classification Search
  CPC ..... A22C 17/08; A22C 17/0093; B08B 3/022; B08B 3/3024; B08B 6/00; B08B 2203/02211
(Continued)

(56) References Cited

U.S. PATENT DOCUMENTS 7,467,994 B2 * 12/2008 Griffiths ............... A22B 5/0082
  452/52
7,588,486 B2 * 9/2009 Horst ..................... A22C 21/02
  452/58
(Continued)

FOREIGN PATENT DOCUMENTS

JP  60-083091 U  6/1985
JP  05-067382 U  9/1993
(Continued)

OTHER PUBLICATIONS

International Search Report and Written Opinion for International Application No. PCT/US2019/044706, dated Nov. 18, 2019, 13 pgs.

*Primary Examiner* — Richard T Price, Jr.
(74) *Attorney, Agent, or Firm* — Lorenz & Kopf, LLP

(57) ABSTRACT

A multi-angle wash system for cleaning carcass, wherein the wash system comprises a multi-angle fluid distribution unit; a rotating unit; a spray unit fluidly and operably coupled to the multi-angle fluid distribution unit; and a guiding unit operably coupled to the spray unit or the multi-angle fluid distribution unit. The multi-angle fluid distribution unit comprises a connecting element that is configured to operably couple with the spray unit such that the spray unit oscillates in correspondence to the rotation of the rotating unit. The spray unit comprises a guiding element and nozzle sprays. The guiding unit comprises a co-guiding element that has a reciprocate structure to the guiding element of the spray unit such that the guiding unit facilitates the oscillation
(Continued)

of the spray unit in correspondence to the rotation of the rotating unit.

19 Claims, 9 Drawing Sheets

Related U.S. Application Data division of application No. 16/052,357, filed on Aug. 1, 2018, now Pat. No. 10,455,843.

(51) Int. Cl.
    *B08B 3/02*     (2006.01)
    *B08B 6/00*     (2006.01)

(52) U.S. Cl.
    CPC ............... *B08B 3/024* (2013.01); *B08B 6/00* (2013.01); *B08B 2203/0211* (2013.01)

(58) Field of Classification Search
    USPC ........................................................ 452/173
    See application file for complete search history.

(56) References Cited

U.S. PATENT DOCUMENTS

| | | | |
|---|---|---|---|
| 8,012,002 B2 * | 9/2011 | Brown | ................. A22B 5/0082 |
| | | | 452/173 |
| 8,444,457 B2 * | 5/2013 | Shermer | ................. B24B 23/00 |
| | | | 451/529 |
| 2008/0020694 A1 | 1/2008 | Hilgren et al. | |
| 2009/0215368 A1 | 8/2009 | Van Den Griend et al. | |
| 2010/0297923 A1 | 11/2010 | Brown | |
| 2013/0231034 A1 | 9/2013 | O'Neil et al. | |

FOREIGN PATENT DOCUMENTS

| | | |
|---|---|---|
| JP | 2000-093913 A | 4/2000 |
| JP | 2013-240732 A | 12/2013 |
| KR | 10-2014-0105890 A | 9/2014 |

\* cited by examiner

MULTI-ANGLE CARCASS WASH SYSTEMS, WASH CABINETS INCLUDING SAME, AND RELATED METHODS

CROSS-REFERENCE TO RELATED APPLICATIONS

This application is a continuation of U.S. patent application Ser. No. 16/667,508 filed Oct. 29, 2019 (now U.S. Pat. No. 11,412,748) which is a divisional of U.S. patent application Ser. No. 16/052,357 filed Aug. 1, 2018 (now U.S. Pat. No. 10,455,843) of which are incorporated by reference herein.

TECHNICAL FIELD

Embodiments of the present disclosure relate to apparatuses and processes for cleaning an animal carcass and, more particularly, to multi-angle wash systems used in, for example, supplying wash fluid to at least a portion of animal carcass in slaughter facilities.

BACKGROUND

Slaughter facilities utilize a variety of wash systems and cabinets to clean animal carcasses. Wash systems that spray pressurized jets of water onto animal carcasses are generally known within the industry. Particular to slaughter facilities for large animals, such as beef or pork, wash systems have long been used which include a number of spaced apart spray bars, each bar having a plurality of openings or spray nozzles through which pressurized water is sprayed directly onto an animal carcass to remove debris, blood and the like. Wash systems may include two (2) or more spray bars spaced apart to form an alleyway. Carcasses, often hanging from shackles, are transported through the alleyway between the rows of spray bars so that the carcass are washed. As the carcasses travel through the alleyway, they are subjected to the pressurized water spray that is emitted from the spray nozzles on the spray bars.

It is also common for the spray bars to be mounted on racks to form a sprayer wall assembly. Multiple spray bars are spaced apart and aligned such that the spray nozzles on each spray bar are generally oriented in the same direction, aimed generally inward the alley way. The animal carcasses are transported between the spaced apart sprayer walls such that the carcass is washed.

A large amount of wash fluid is required to sufficiently clean animal carcass, and consequently a large volume of fluid waste is generated. This fluid waste cannot easily be disposed, or recirculated and reused if contamination is to be avoided. In addition, there are portions of carcass surface that are not contacted with wash fluid Accordingly, there is a need for a wash system that improves the effectiveness in cleaning carcass, while reducing the volume of wash fluid required for washing carcass and reducing the volume of fluid waste.

BRIEF DESCRIPTION OF THE DRAWINGS

FIG. 4A-4B shows the guiding element of spray unit and the co-guiding element of guiding unit according to an exemplary embodiment of the present disclosure, wherein FIG. 4A shows the guiding element of spray unit, and FIG. 4B shows the guiding element resting in the co-guiding element of guiding unit.

DESCRIPTION OF THE DISCLOSURE

In some embodiments, a multi-angle wash system for use in a slaughter facility that can clean carcass more thoroughly and with a reduced volume of wash fluid is provided. The wash systems and cabinets of the present disclosure and their related methods of operation improve upon conventional wash systems and cabinets by offering similar or improved rinse performance using lower volumes of wash fluid, and thus generating less fluid waste. Through the use of multi-angle wash system, substantially the entire exterior surface of carcass can be exposed to total spray coverage, even at a reduced volume of wash fluid.

The term "carcass" as used in herein means the whole body or portions of an animal after exsanguination. The carcass can be of the following animals: bovine, porcine, equine, caprine, ovine, avian animals, or any other animal commonly slaughtered for food production. Bovine animals include, but are not limited to, buffalo and all cattle. Porcine animals include, but are not limited to, feeder pigs and breeding pigs. Ovine animals include, but are not limited to, sheep such as rams and lambs. Caprine animals include, but are not limited to, goats. Avian animals include, but are not limited to, chickens, turkeys, and ostriches. Portions of animal may include, but are not limited to, head and tongue.

As used herein, any relational terms, such as "first", "second" and "third"; or "top" and "bottom"; or "front" and "back", etc., are used for clarity and convenience in understanding the present disclosure and accompanying drawings. These terms do not connote or depend on any specific preference or orientation. Rather, the terms are used herein to distinguish one element from another.

Unless the context clearly requires otherwise, throughout the description and the claims, the words "comprise", "comprising", and the like are to be construed in an inclusive sense as opposed to an exclusive or exhaustive sense; that is to say, in a sense of "including, but not limited to." When the claims use the word "or" in reference to a list of two or more items, that word covers all a the following interpretations of the word: any of the items in the list, all of the items in the list, and any combination of the items in the list.

Figure 1:
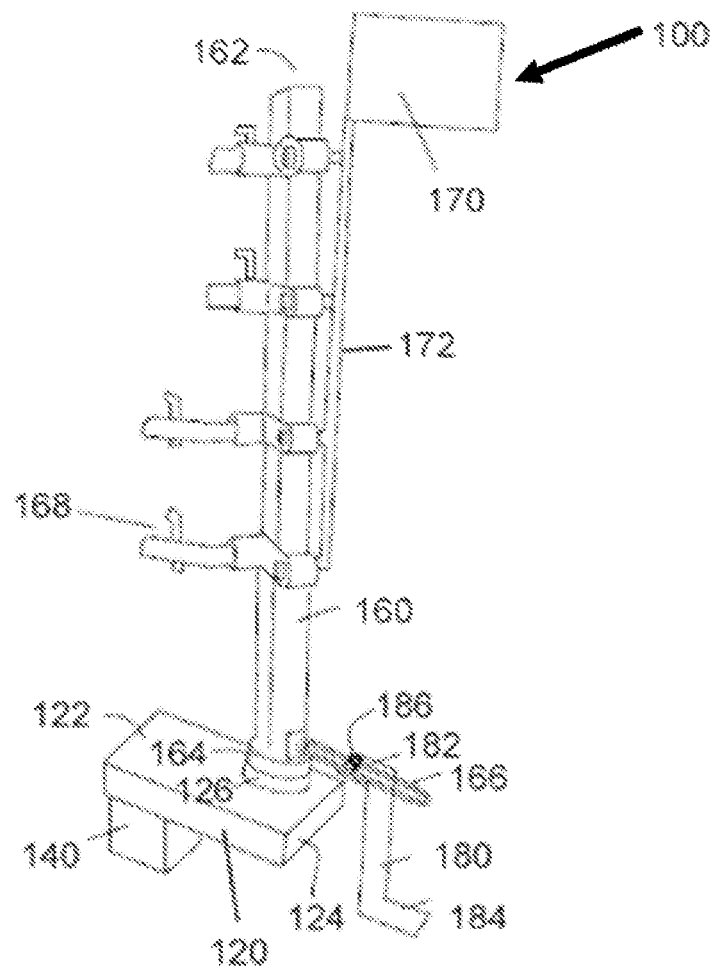
FIG. 1 is a perspective view of a multi-angle wash system according to an exemplary embodiment of the present disclosure.

FIG. 1 shows a multi-angle wash system according to one embodiment of the present disclosure. The multi-angle wash system 100 includes a multi-angle fluid distribution unit 120, a rotating unit 140 operably coupled to the multi-angle fluid distribution unit 120, a spray unit 160 fluidly and operably coupled to the multi-angle fluid distribution unit 120, and a guiding unit 180 operably coupled to the spray unit 160. The rotating unit 140 and the guiding unit 180 may be secured, for example, to the floor or ledge of a wash cabinet. Although FIG. 1 shows that the guiding unit 180 is operably coupled to the spray unit 160, it is understood that in some embodiments of present disclosure the guiding unit 180 may be operably coupled to the multi-angle fluid distribution unit 120.

Figure 2:
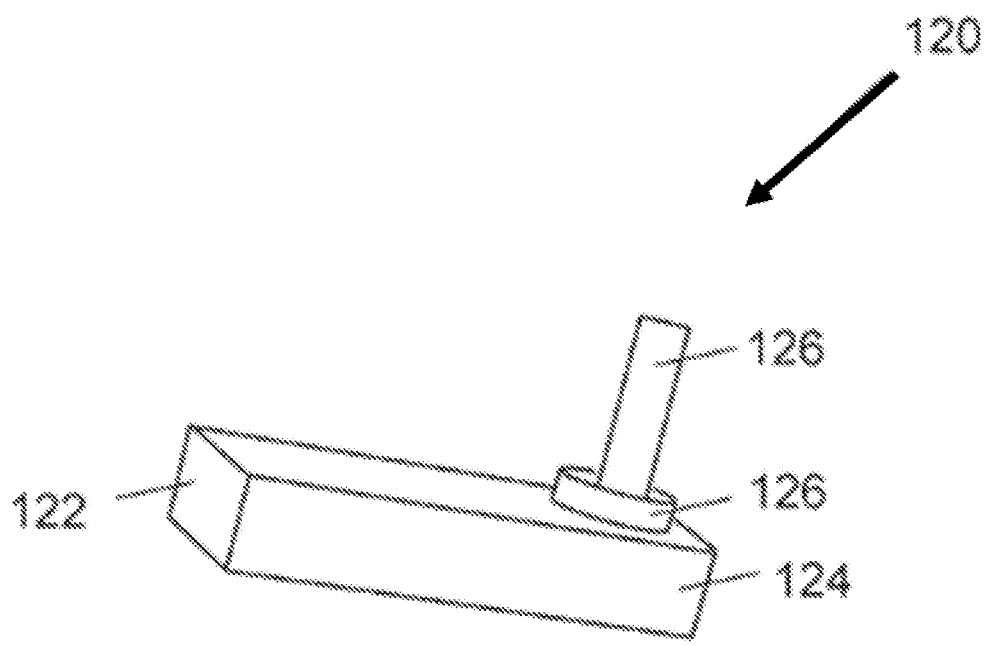
FIG. 2 is a perspective view of a multi-angle fluid distribution unit according to an exemplary embodiment of the present disclosure.
Figure 3:
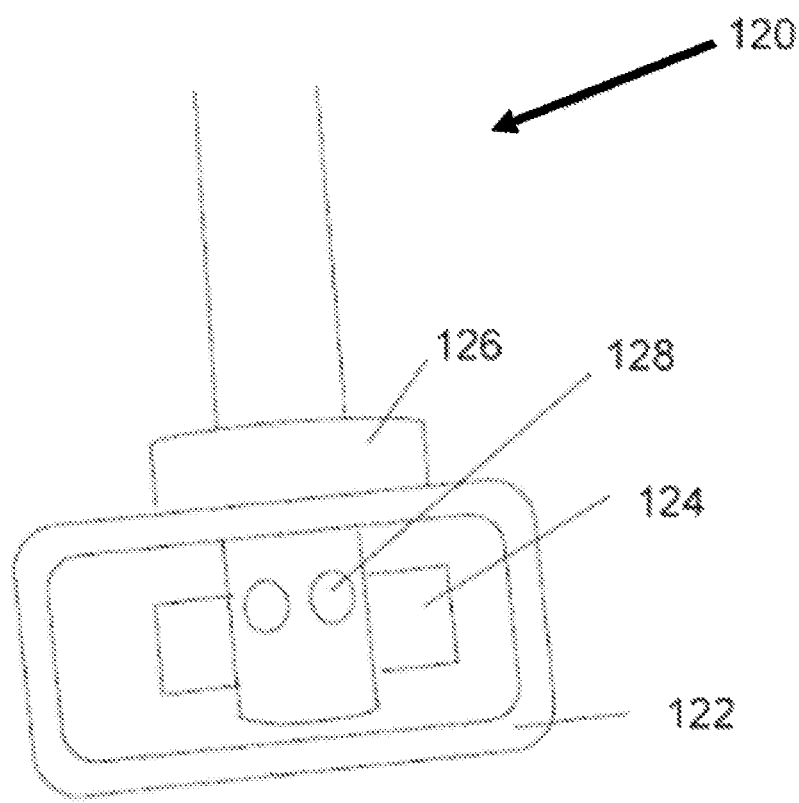
FIG. 3 is a cross sectional view of a multi-angle fluid distribution unit according to an exemplary embodiment of the present disclosure.

FIG. 2 shows a perspective drawing of a multi-angle fluid distribution unit 120 according to one embodiment of the present disclosure. The multi-angle fluid distribution unit 120 comprises a front end 122, a back end 124 opposite to the front end 122, a connecting element 126 adjacent to the back end 124. The front end 122 is operably coupled to the rotating unit 140 (shown in FIG. 1). As shown in FIG. 1, the connecting element 126 is configured to operably couple with the spray unit 160 such that the spray unit 160 oscillates in response to the rotation of the rotating unit 140. FIG. 3 shows a cross sectional drawing of a multi-angle fluid distribution unit according to one embodiment of the present disclosure. In some embodiments as shown in FIG. 3, the multi-angle fluid distribution unit 120 may further comprises at least one opening 128 as the outlet for wash fluid.

Referring to FIG. 1, the spray unit 160 comprises a top end 162, a bottom end 164 operably coupled to the connecting element 126 of the multi-angle fluid distribution unit 120, a guiding element 166 adjacent to the bottom end 164, and at least one series of nozzle sprays 168 arranged in vertical direction along the length of the spray unit 160. The top end 162 is configured to fluidly couple with a fluid supply. The spray nozzle 168 may be selected to provide a spray pattern optimized for cleaning carcass. Furthermore, the spray nozzles 168 may be configured in any number of ways depending on desired nozzle spray patterns. In some embodiments, the spray nozzles 168 are designed to emit a flat or planar, fan-shaped spray pattern which applies a substantially uniform force per unit area across the carcass surface area it contacts. Additionally, the spray nozzles 168 may be arranged such that the fan-shaped spray patterns emitted therefrom collectively form a composite spray pattern which directs foreign matter downwardly and off the carcass surface as it sweeps laterally across the carcass.

In some embodiments, the wash system 100 may further comprise a motor 170 and a linkage member 172, whereby the linkage member 172 mechanically interconnects the motor 170 to each nozzle spray 168 on the spray unit 160.

Referring to FIG. 1, the guiding unit 180 is positioned near the back end 124 of the multi-angle fluid distribution unit 120 and operably coupled with to the spray unit 160. In a particular embodiment, the guiding unit 180 comprises a first end 182, a second end 184, and a co-guiding element 186 adjacent to the first end 182. The co-guiding element 186 of the guiding unit 180 has a reciprocate structure to the guiding element 166 of the spray unit 160, such that the guiding unit 180 facilitates the oscillation of the spray unit 160 in correspondence to the rotation of the rotating unit 140. In some embodiments as shown in FIG. 1, the co-guiding element 186 may be a protruding structure adjacent to the first end 182 of the guiding unit 180, while the guiding element 166 of the spray unit 160 may be a longitudinally extended slot. The guiding slot 166 may have a width slightly larger than a diameter of the co-guiding protruding element 186, such that the co-guiding protruding element 186 is allowed to slide forward and rearward in the guiding slot 166.

Figure 4A:
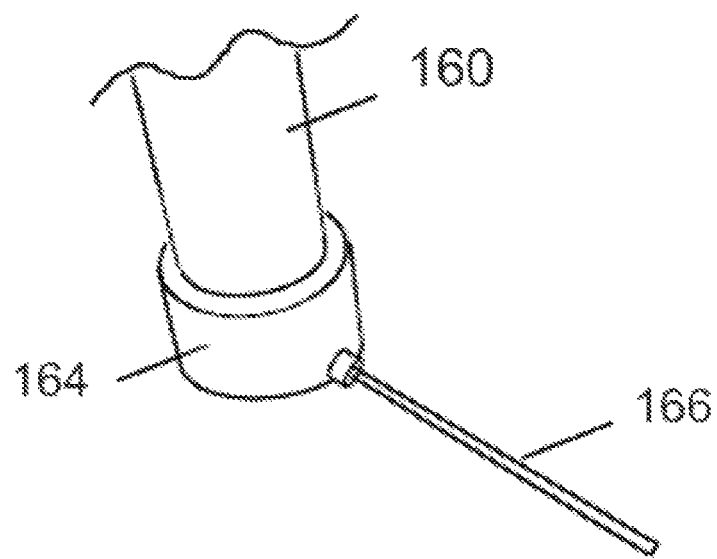
Figure 4B:
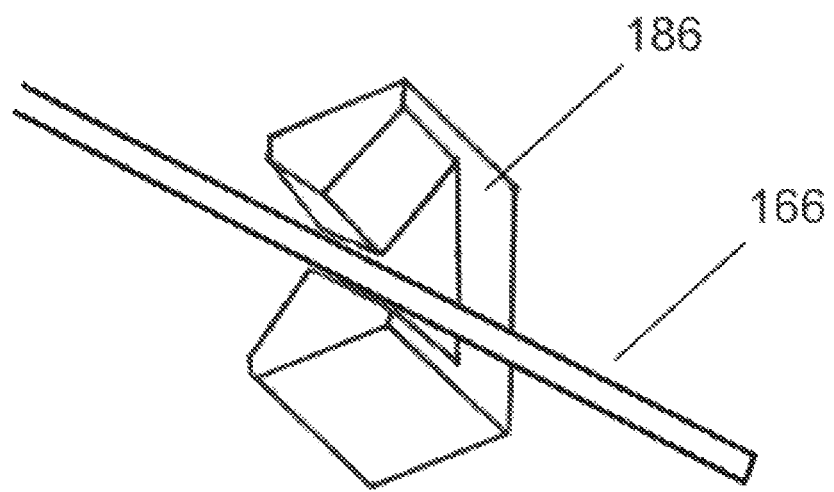

FIG. 4 shows the guiding element 166 of the spray unit 160 and the co-guiding element 186 of the guiding unit according to another exemplary embodiment of the present disclosure. FIG. 4A shows the partial drawing of the spray unit 160, which includes a bottom end 164 that is configured to operably couple with the multi-angle fluid distribution unit, and a guiding element 166 that is an extended rod. FIG. 4B shows the co-guiding element 186 of the guiding unit that has a slot structure to support and guide the guiding element 166.

In some embodiments, wash fluid comprises water. When desired, wash fluid may further comprise an antimicrobial chemical. Wash fluid may be provided at a temperature of from about room temperature to an elevated temperature. In some embodiments, wash fluid may be provided at a temperature from about 33° F. to about 40° F. In other embodiments, wash fluid may be provided at a temperature of at least 180° F., preferably from about 180° F. to about 210° F., more preferably from about 180° F. to about 190° F.

Additional embodiments include methods of washing a carcass. An exemplary method includes conveying carcass 200 in a direction through at least one pair of the multi-angle wash systems 100, such that the distance between the carcass 200 and the nozzle sprays 168 of the spray unit 160 remains substantially the same throughout the period that carcass 200 is passed through the at least one pair of multi-angle wash systems 100, which maintains the pressure of the wash contacting the surface of the carcass substantially consistent.

Figure 5A:
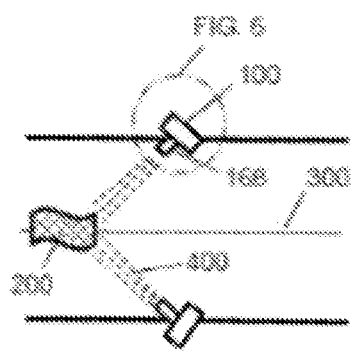
FIG. 5A-5C is a top view showing carcass is conveyed in a direction through the multi-angle wash systems 100 from the positions in FIG. 5A to FIG. 5B, and then FIG. 5C, according to an exemplary embodiment of the disclosure.
Figure 5B:
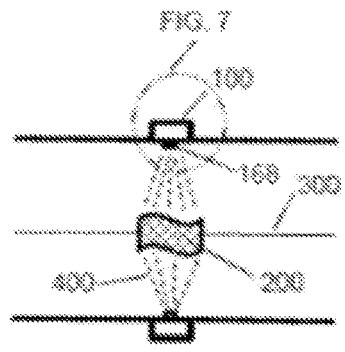
Figure 5C:
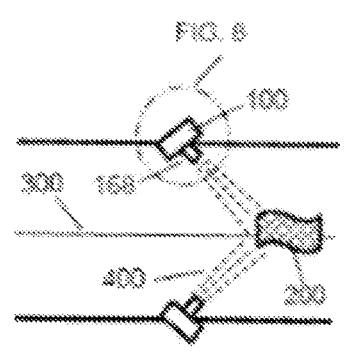
Figure 6:
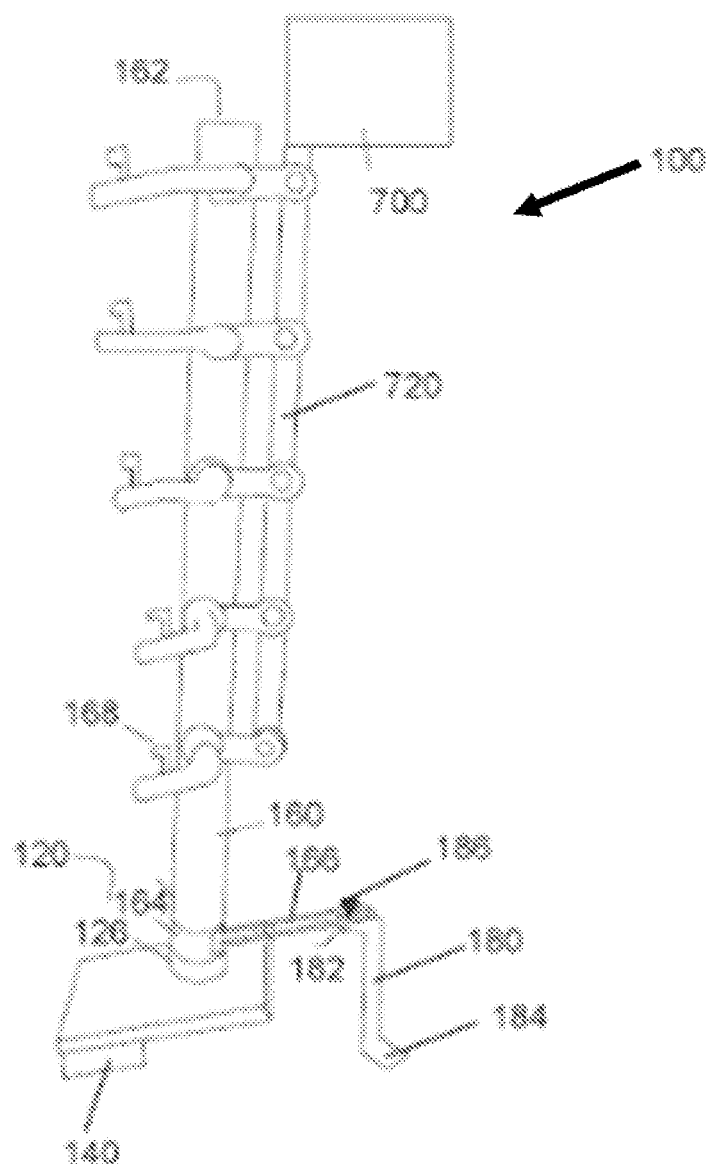
FIG. 6 is a magnified perspective view of a multi-angle wash system in FIG. 5A.
Figure 7:
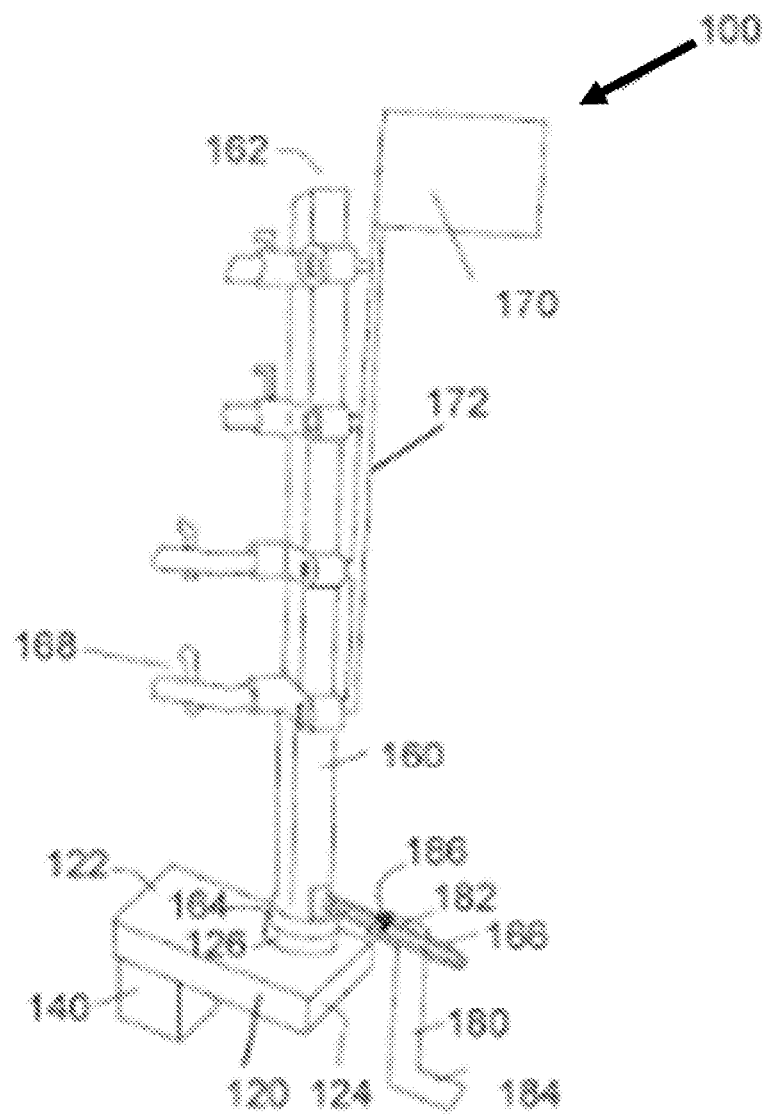
FIG. 7 is a magnified perspective view of a multi-angle wash system in FIG. 5B.
Figure 8:
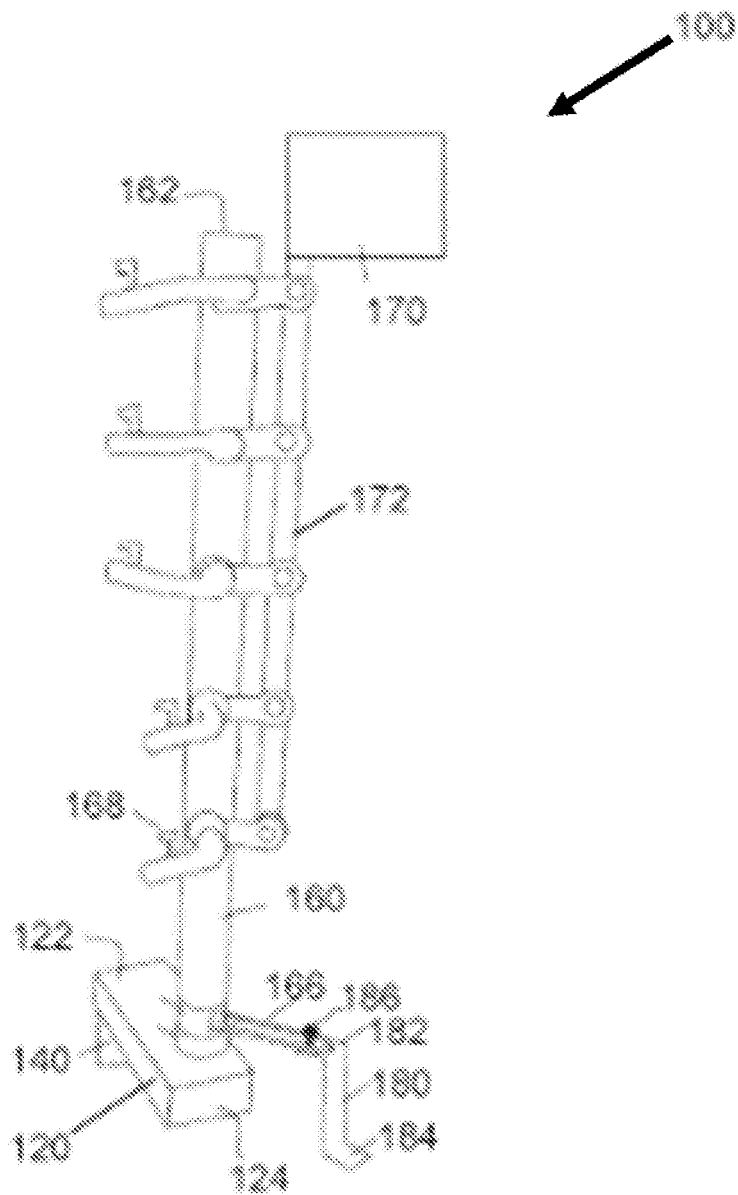
FIG. 8 is a magnified perspective view of a multi-angle wash system in FIG. 5C.

Referring to FIG. 5, a pair of multi-angle wash systems 100 according to one embodiment of the present disclosure is shown having carcass 200 attached to a conveyor 300 that is configured to transport carcass 200 through the multi-angle wash system 100. The wash system 100 includes spray nozzles 168 to direct the spray 400 of wash fluid onto carcass 200. As shown in FIG. 6 to FIG. 8, the wash system 100 includes a multi-angle fluid distribution unit 120 operably coupled to a rotating unit 140 that is configured to rotate relative to moving of the conveyor 300. Thus, the spray nozzles 168 oscillate along with carcass 200 on the conveyor 300 as shown in FIG. 5A to FIG. 5C to clean the carcass from various angles while maintaining a substantially consistent pressure.

In FIG. 5A, carcass 200 is shown at a first location on the conveyor 300, and the spray nozzles 168 on the spray unit of the multi-angle wash system 100 is shown in a first moving position with fluid spray 400 directed primarily on a leading surface of carcass 200. FIG. 6 is a magnified perspective view of a multi-angle wash system 100 accordance to FIG. 5A. As shown in FIG. 6, the co-guiding element 186 of the guiding unit 180 slides rearward in the guiding slot 166 to facilitate the oscillation of the spray unit 160 such that the spray nozzles 168 emit fluid spray 400 toward the leading surface of carcass 200.

In FIG. 5B, carcass 200 is shown at a second location on the conveyor 300, and the spray nozzles 168 on the spray unit of the multi-angle wash systems 100 are shown in a second moving position with fluid spray 400 directed primarily on the middle surface of the carcass 200. FIG. 7 is a magnified perspective view of a multi-angle wash system 100 accordance to FIG. 5B. As shown in FIG. 7, the co-guiding element 186 of the guiding unit 180 slides forward in the guiding slot 166 to facilitate the oscillation of the spray unit 160 such that the spray nozzles 168 emit fluid spray 400 toward the middle surface of carcass 200. In order to maintain the distance between the spray nozzles 168 and the contacted surface of carcass 200 constant (i.e., to be substantially the same in FIG. 5B as in FIG. 5A), the rotating unit 140 moves the multi-angle fluid distribution unit 120 as well as the spray unit 160 attached thereto, such that the co-guiding element 186 of the guiding unit 180 slides forward in the guiding slot 166. This permits the fluid distribution unit 120 as well as the spray unit 160 to move laterally and in a arcuate fashion to follow the moving carcass 200 through the multi-angle wash system 100.

In FIG. 5C, carcass 200 is shown at a third location on the conveyor 300, and the spray nozzles 168 on the spray unit of the multi-angle wash system 100 is shown in a third moving position with fluid spray 400 directed primarily on the tailing surface of carcass 200. FIG. 8 is a magnified perspective view of a multi-angle wash system 100 accordance to FIG. 5C. As shown in FIG. 8, the co-guiding element 186 of the guiding unit 180 slides rearward in the guiding slot 166 to facilitate the oscillation of the spray unit 160 such that the spray nozzles 168 emit fluid spray 400 toward the trailing surface of carcass 200. In order to maintain the distance between the spray nozzles 168 and the contacted surface of carcass 200 in FIG. 5C constant (i.e., to be the same as in FIG. 5A and FIG. 5B), the rotating unit 140 moves the multi-angle fluid distribution unit 120 as well as the spray unit 160 attached thereto, such that the co-guiding element 186 of the guiding unit 180 slides rearward in the guiding slot 166.

In the disclosed wash systems 100, the spray nozzles 168 oscillate along with carcass 200 on the conveyor 300 as carcass 200 moves pass the wash system 100, such that the distance between the nozzle sprays 168 and the contacted surface of carcass 200 remains substantially the same throughout the period that carcass 200 is passed through the wash systems 100. As the distance between the nozzle sprays 168 and the contacted surface of carcass 200 remains substantially the same, the contacted surfaces of carcass 200 are subjected to substantially the same level of pressure from the wash fluid throughout the washing process. Furthermore, this allows for all exterior surfaces of the carcass to be substantially contacted with the spray of wash fluid, resulting in an increased efficacy of the cleaning and/or a reduced volume of required wash fluid as compared to the conventional wash system known in the art.

As carcass 200 is passed through the wash systems 100, the multi-angle fluid distribution unit 120 of the wash system may return to its original location (e.g., first moving position as in FIG. 5A) such that the fluid spray 400 is directed primarily on a leading surface of the next carcass. In a particular embodiment, the flow of fluid may be temporarily stopped when the wash system 100 returns to its original location (FIG. 5A) from its third location (FIG. 5C) in order to further conserve use of fluid or water.

Figure 9:
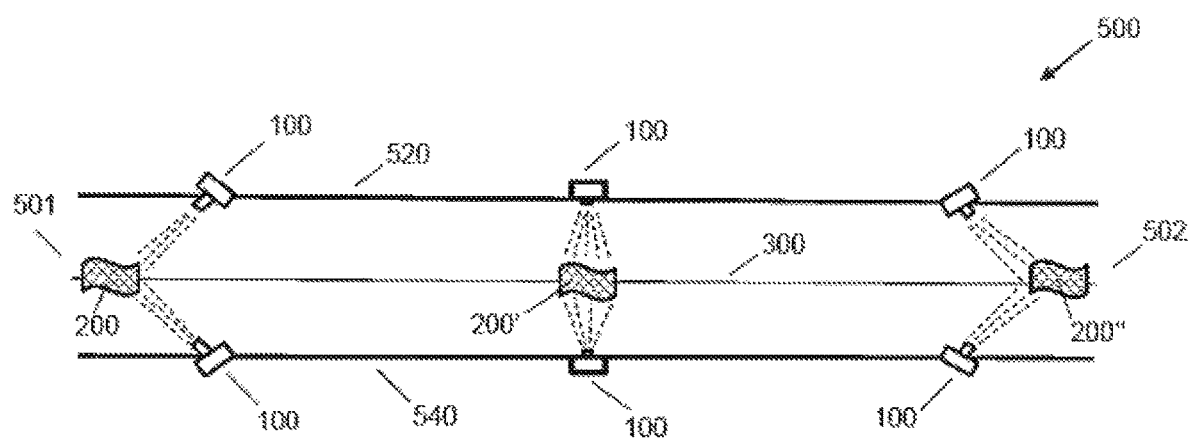
FIG. 9 is a top view of a wash cabinet according to an exemplary embodiment of the present disclosure.

In yet additional embodiments, the present disclosure includes a wash cabinet for use in a slaughter facility. FIG. 9 shows a wash cabinet according to one embodiment of the present disclosure. The cabinet assembly 500 comprises a pair of opposed side walls 520, 540 defining an entrance 501 and an exit 502 of the wash cabinet 500, and a conveyor 300 for carrying carcasses 200, 200', 200" into the entrance 501 and out the exit 502. The cabinet assembly 500 further comprises at least a pair of the multi-angle wash systems 100 placed along the corresponding side wall 520, 540. The rotating unit of the multi-angle wash systems 100 may be configured to rotate in correspondence to the conveyor 300.

In alternative embodiments, an electrostatic spray coating system may be used with the aforementioned embodiments of the wash system. Any suitable electrostatic spray coating system may be employed, such as a system wherein coating particles (e.g., antimicrobial fluid or sanitizer) are emitted from a spray device (e.g., an electrostatic sprayer or nozzle) toward a carcass to be coated. The system may be in the form of any suitable apparatus for applying an electrostatic enhanced particle or compound. The coating particles may be in the form of a powder transported to the spray device in a fluid stream such as air, or in the form of liquid, or the like. The coating particles may be atomized by the spray device utilizing conventional air atomization, hydraulic atomization, and/or rotary atomization. The spray device may include one or more electrodes which cause the particles emitted by the spray device to carry an electrostatic charge such that when the charged particles are propelled by the spray device toward the carcass, which is maintained at an electrostatic potential different than that of the charged coating particles, the coating particles will be deposited on the carcass with improved efficiency and coverage. The electrical charge transfer mechanism may involve contact charging, corona charging, inductive charging, and/or ionization, etc. in accordance with charging principles which are well known in the electrostatic coating field. In a particular embodiment, a carcass is conveyed in a direction through at least one pair of the multi-angle electrostatic systems such that the distance between the head and tongue and the nozzle sprays of the multi-angle sanitizing systems remains substantially the same throughout the period that the carcass is passed through the at least one pair of multi-angle sanitizing systems.

The above detailed descriptions of embodiments of the disclosure are not intended to be exhaustive or to limit the invention to the precise form disclosed above. Although specific embodiments of, and examples for, the disclosure are described above for illustrative purposes, various equivalent modifications are possible within the scope of the disclosure, as those skilled in the relevant art will recognize. For example, the various embodiments described herein can be combined to provide further embodiments.

In general, the terms used in the following claims should not be construed to limit the disclosure to the specific embodiments disclosed in the specification, unless the above detailed description explicitly defines such terms. While certain aspects of the disclosure are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A multi-angle wash system, comprising:
a multi-angle fluid distribution unit;
a rotating unit operably coupled to the multi-angle fluid distribution unit;
a spray unit fluidly and operably coupled to the multi-angle fluid distribution unit; and
a guiding unit operably coupled to the spray unit or the multi-angle fluid distribution unit,
wherein the multi-angle fluid distribution unit comprises a front end operably coupled to the rotating unit, a back end opposite to the front end, and a connecting element adjacent to the back end, and wherein the connecting element is configured to operably couple with the spray unit or the multi-angle fluid distribution unit such that the spray unit oscillates in correspondence to the rotation of the rotating unit,
wherein the spray unit comprises a top end, a bottom end operably coupled to the connecting element of the multi-angle fluid distribution unit, a guiding element adjacent to the bottom end, and at least one series of nozzle sprays arranged in vertical direction along the length of the spray unit, wherein the guiding unit comprises a first end, a second end, and a co-guiding element adjacent to the first end of the guiding unit, wherein the guiding element has a reciprocate structure to the guiding element of the spray unit such that the guiding unit facilitates the oscillation of the spray unit in correspondence to the rotation of the rotating unit; and wherein the rotating unit and the guiding unit are secured to a cabinet.

2. The wash system of claim 1, wherein the guiding unit is operably coupled to the spray unit.

3. The wash system of claim 1, wherein the top end of the spray unit is configured to fluidly couple with a fluid supply.

4. The wash system of claim 1, further comprising a motor and a linkage member, wherein the linkage member mechanically interconnects the motor to each nozzle spray on the spray unit.

5. The wash system of claim 1, wherein the co-guiding element is a protruding structure and the guiding element is a longitudinally extended slot, and wherein the guiding slot has a width slightly larger than a diameter of the co-guiding protruding element such that the co-guiding protruding element can slide forward and rearward in the guiding slot.

6. The wash system of claim 1, wherein the guiding element is an extended rod and the co-guiding element has a slot structure that is configured to support and guide the guiding element.

7. The wash system of claim 1, further comprising of an apparatus for applying electrostatic enhanced fluid.

8. The wash system of claim 1, wherein the spray unit comprises an electrostatic sprayer.

9. A method of cleaning carcass, comprising conveying a carcass in a direction through at least one pair of the multi-angle wash systems of claim 1 such that the distance between the carcass and the nozzle sprays of the multi-angle wash systems remains substantially the same throughout the period that carcass is passed through the at least one pair of multi-angle wash systems.

10. The method of claim 9, wherein the rotating unit of the wash system is configured to rotate relative to the moving of conveyor such that the spray nozzles of the wash system oscillate along with carcass on the conveyor.

11. The method of claim 10, comprising moving the carcass to a first location on a conveyor, wherein the spray nozzles of the multi-angle wash system are in a first moving position to direct the spray of wash fluid primarily onto a leading surface of carcass.

12. The method of claim 11, wherein the co-guiding element of the wash system is a protruding structure and the guiding element of the wash system is a longitudinally extended slot, and wherein the co-guiding element slides rearward in the guiding slot to facilitate the oscillation of the spray unit such that the spray nozzles emit the spray of wash fluid primarily onto the leading surface of the carcass.

13. The method of claim 11, further comprising moving the carcass to a second location on the conveyor, wherein the spray nozzles of the multi-angle wash system are in a second moving position to direct the spray of wash fluid primarily onto a middle surface of carcass.

14. The method of claim 13, wherein the co-guiding element of the wash system is a protruding structure and the guiding element of the wash system is a longitudinally extended slot, and wherein the co-guiding element slides forward in the guiding slot to facilitate the oscillation of the spray unit such that the spray nozzles emit the spray of wash fluid primarily onto the middle surface of the carcass.

15. The method of claim 13, further comprising moving the carcass to a third location on the conveyor, wherein the spray nozzles of the multi-angle wash system are in a third moving position to direct the spray of wash fluid primarily onto a tailing surface of carcass.

16. The method of claim 15, wherein the co-guiding element of the wash system is a protruding structure and the guiding element of the wash system is a longitudinally extended slot, and wherein the co-guiding element slides rearward in the guiding slot to facilitate the oscillation of the spray unit such that the spray nozzles emit the spray of wash fluid primarily onto the tailing surface of the carcass.

17. The method of claim 9, wherein the spray nozzles of the wash systems oscillate along with the carcass on the conveyor as the carcass moves pass the wash systems, such that the distance between the nozzle sprays and the contacted surface of carcass remains substantially the same throughout the period that the carcass is passed through the wash systems.

18. The method of claim 9, further comprising conveying the carcass in a direction through at least one pair of the multi-angle electrostatic systems.

19. A wash cabinet, comprising:
a pair of opposed side walls defining an entrance and an exit of the wash cabinet;
a conveyor for carrying carcass into the entrance and out the exit of the wash cabinet; and
at least a pair of the multi-angle wash systems according to claim 1 placed along the corresponding side walls, wherein the rotating unit of the multi-angle wash systems is configured to rotate in correspondence to the conveyor.

* * * * *